United States Patent

[11] 3,613,504

| [72] | Inventor | Hans G. Krauss<br>Broomall, Pa. |
|---|---|---|
| [21] | Appl. No. | 3,703 |
| [22] | Filed | Jan. 19, 1970 |
| [45] | Patented | Oct. 19, 1971 |
| [73] | Assignee | The Boeing Company<br>Seattle, Wash. |

[54] JAMPROOF AND FAIL OPERATIONAL SERVO VALVE FOR AIRCRAFT FLIGHT CONTROL HYDRAULIC SYSTEMS
10 Claims, 4 Drawing Figs.

[52] U.S. Cl................................................. 91/32,
244/85, 91/450
[51] Int. Cl.......................................... F15b 13/04
[50] Field of Search........................... 244/85;
91/32, 450

[56] References Cited
UNITED STATES PATENTS

| 2,898,889 | 8/1959 | Foster............................ | 91/32 |
| 3,120,787 | 2/1964 | Schmitt......................... | 244/85 X |
| 3,253,613 | 5/1966 | Richolt......................... | 244/85 X |

*Primary Examiner*—Andrew H. Farrell
*Attorneys*—Albert W. Hilburger, John D. Fischer and Joseph M. Corr ABSTRACT: When the primary valve spool in an aircraft flight control servo valve jams or seizes, at any position within its stroke, the aircraft pilot is enabled not only to halt the resulting run away condition of the affected power ram in the flight control system but is also enabled quite readily to regain full operational control of the aircraft. This regaining of control is made possible through the manual operation of an intermediate auxiliary valve sleeve which will shift with the jammed primary valve spool and the coordinated operation of a primary valve shutoff means which completely nullifies the action of the jammed primary valve spool by closing a return passage for hydraulic fluid.

INVENTOR
Hans G. Krauss,
BY Joseph M. Cox
ATTORNEY

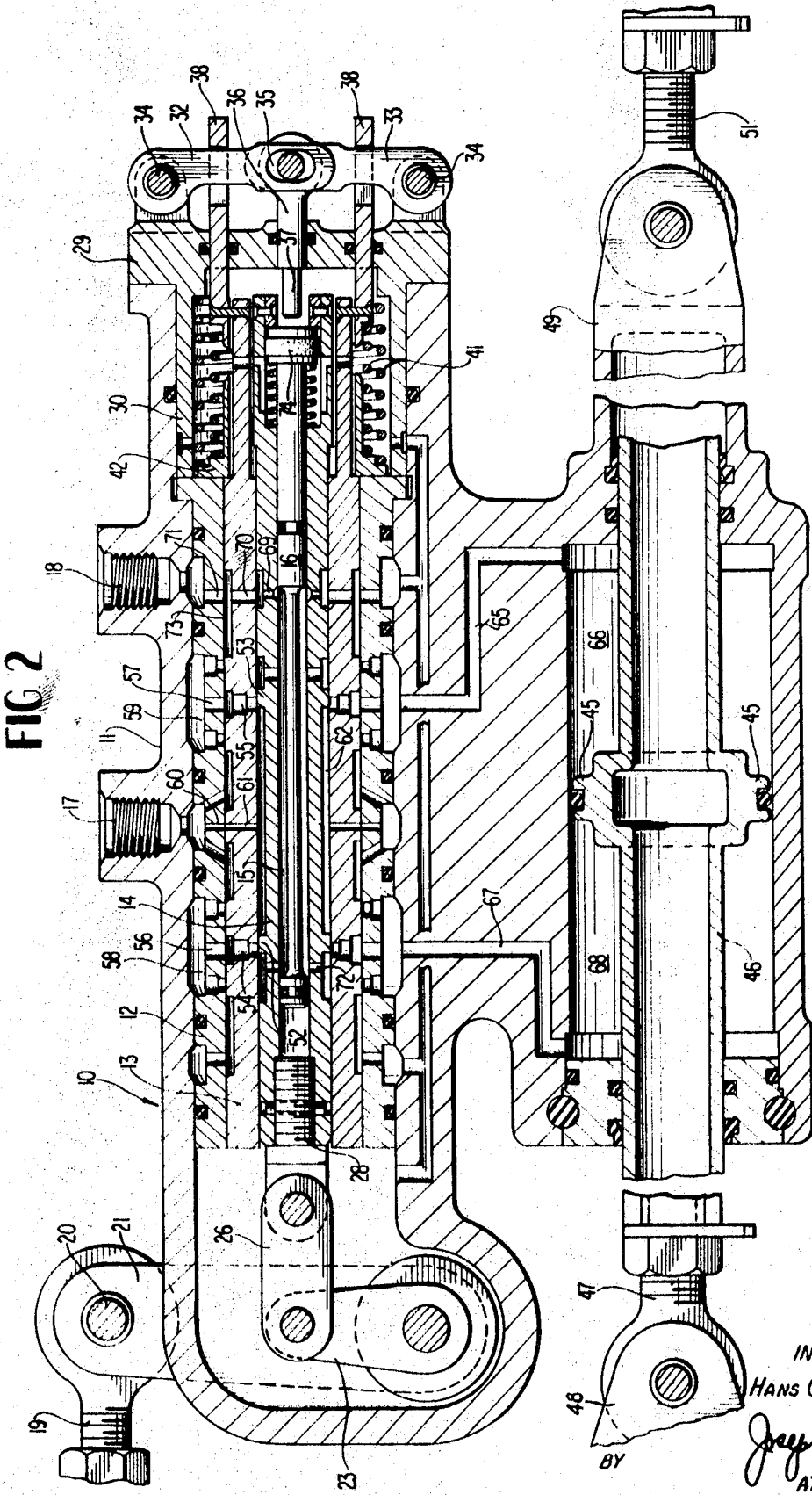

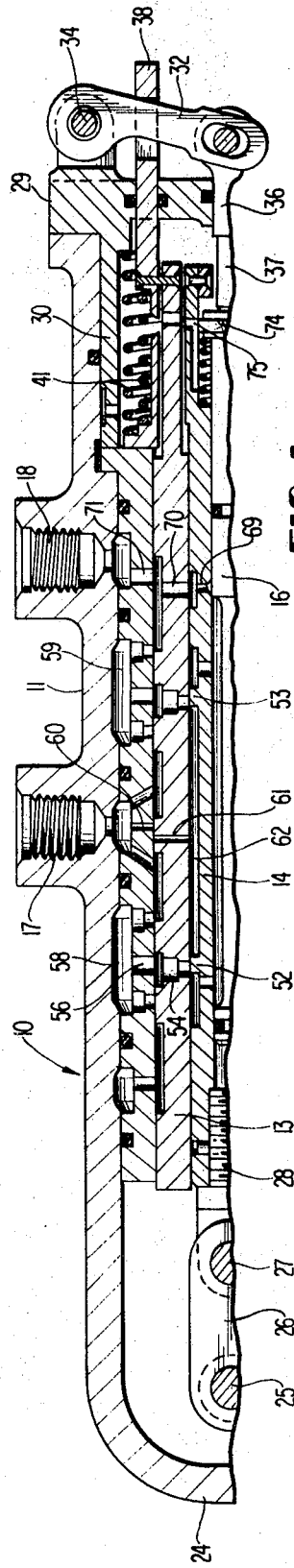

JAMPROOF AND FAIL OPERATIONAL SERVO VALVE FOR AIRCRAFT FLIGHT CONTROL HYDRAULIC SYSTEMS

BACKGROUND OF THE INVENTION

Modern passenger aircraft and large helicopters require powered flight control elements simply because of the large aerodynamic forced involved. The aircraft flight controls are commonly divided or split as on the wings of a large passenger airliner and it is therefore necessary for the aircraft to incorporate separate and independent hydraulic control systems for powering the split controls in order to provide the obvious safety of a backup system in the event of failure of one system. Such redundant hydraulic control systems are conventional and generally have proven to be satisfactory with the exception of one component, namely, the servocontrol valve which is operated by a suitable mechanical linkage from the pilot's compartment. The conventional flight control servo valve generally employs a primary valve spool and the spool is constructed or designed from a single piece of material so as to control the two hydraulic systems. These dual system control valve spools are usually of a tandem configuration but are occasionally built in parallel or side-by-side relationship, in which case the matching of one hydraulic control system to the other must be achieved by very careful adjustment.

In the past, a number of failures of both tandem and parallel servocontrol spools has occurred due to partial or total spool seizure within the valve sleeve. The result of such seizure or jamming is usually an uncontrollable hard-over of the power ram connected with particular flight controls and this may result in loss of aircraft control or simply loss of the aircraft.

Some attempts have been made in the prior art to deal with this serious problem but thus far no complete solution and certainly no economically practical solution has been offered. One example of the prior art is U.S. Pat. No. 3,253,613 to Richolt for a Fail Safe Servo Valve. The Richolt structure employs a primary valve spool and a secondary valve sleeve in such a way that when jamming of the primary spool occurs, the secondary valve sleeve will move and take over the control function to the extent that the pilot will be able to stop the runaway condition of the flight control actuator. However, the Richolt structure does not assure that the pilot will always be able to reverse the actuator motion and thereby bring the aircraft back under control. With the Richolt servo valve, if jamming of the primary valve spool happens to occur at or very near valve neutral, the pilot will be able to regain control of the affected actuator through the operation of the secondary valve sleeve. However, when the primary valve spool seizes at or near its hard-over position (near the end of its stroke), the pilot will only be able to arrest the hard-over motion of the power actuator but will not be able to reverse the actuator motion and thereby gain control. This is true because the secondary valve sleeve requires its own total stroke to simply balance the effect of the seized primary spool. In a short time, the pilot will have to turn off the affected hydraulic system.

The servo valve embodying the present invention in contrast to the Richolt device will always enable the pilot to regain full operational control of the aircraft regardless of the point of seizure of the primary valve spool, whether near valve neutral or at or near the hard-over position. The valve structure of the invention includes a unique and simplified means to nullify the effect of the jammed primary spool at any point in the stroke of the latter by automatically shutting off the main fluid return passage through the primary spool and thus allowing full flight control to be achieved by the operation of the secondary valve sleeve. All that is required of the pilot in order to assure the regaining of full flight control is that he exert somewhat larger input forces on the manual control linkage coupled with the servo valve. This enables the pilot to overcome a certain spring preload on the secondary valve sleeve and to substantially simultaneously deactivate the jammed primary spool by activating a primary valve shutoff spool which locks automatically into place.

Other features and advantages of the invention will appear readily to those skilled in the art during the course of the following description.

BRIEF DESCRIPTION OF THE DRAWING FIGURES

FIG. 2 is a similar cross-sectional view showing an off neutral position of the primary valve spool.

FIG. 3 is a fragmentary central vertical section through the valve illustrating a seizure of the primary valve spool and an incomplete corrective manipulation of mechanism to nullify the effect of the jammed primary spool.

Figure 1:
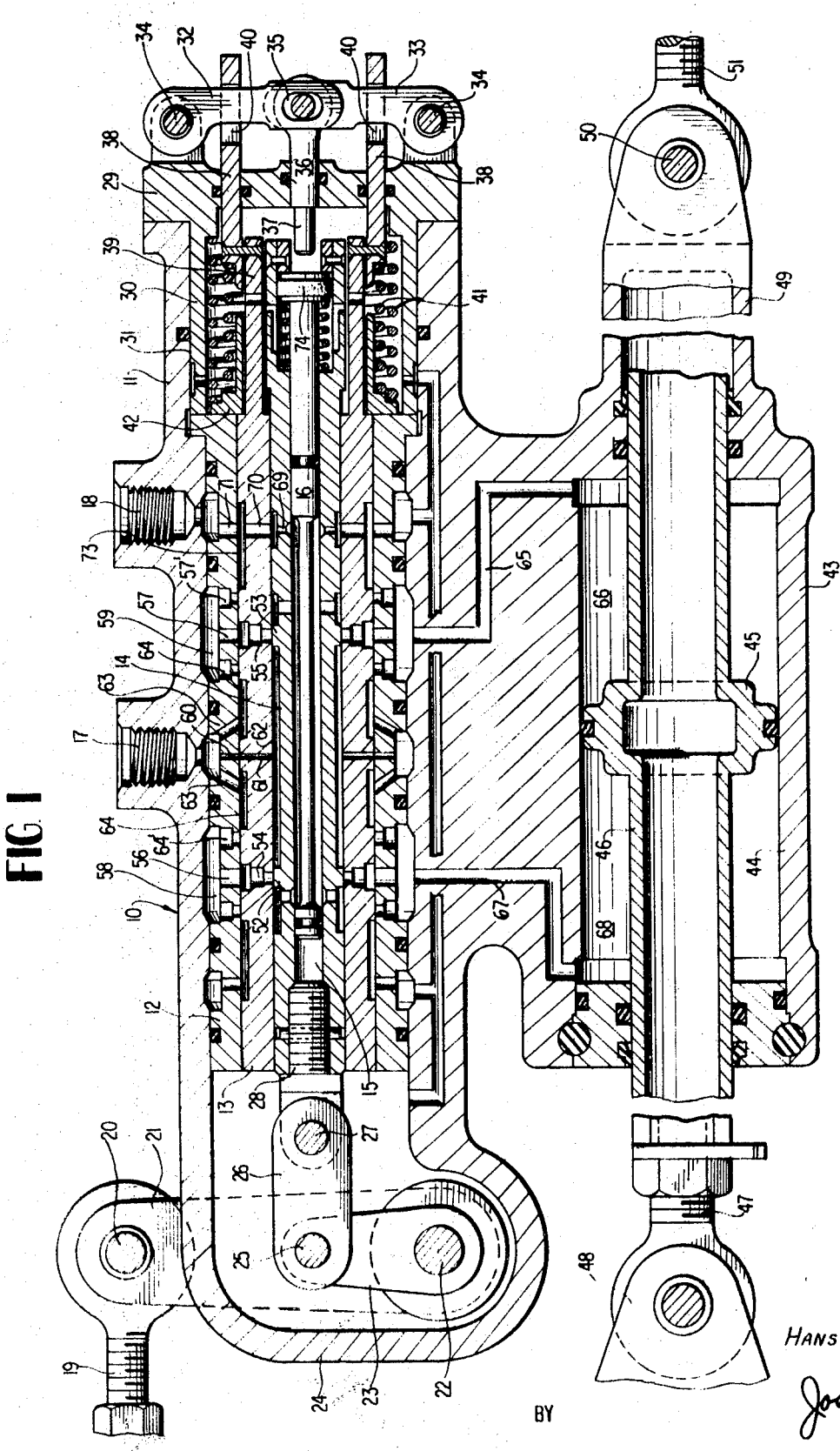
FIG. 1 is a central vertical longitudinal section through a servocontrol valve and power actuator unit embodying the invention, with the primary valve spool positioned at neutral.

FIG. 4 if a similar sectional view showing the relationship of parts when the return passage through the primary spool is shutoff and the pilot has achieved full control through the secondary valve sleeve.

DETAILED DESCRIPTION

It is to be understood in connection with the drawings and the following description that for the sake of clarity and simplicity a basic single system control valve and actuator only has been illustrated and that the invention is readily applicable to present-day tandem valve structures of side-by-side valve structures previously discussed for the control of dual hydraulic systems and split or dual flight control elements.

Referring to the drawings in detail wherein like numerals designate like parts throughout the same, the numeral 10 designates a control valve and actuator body having an exterior valve casing 11 for an outer stationary sleeve 12. Movably mounted within the stationary sleeve 12 is an intermediate or secondary control valve sleeve 13 and movably disposed within the latter is a primary valve spool 14, which is the element subject to jamming or seizing in the bore of the secondary sleeve 13 in some instances, creating a problem which the invention is directed to solving. The primary spool 14 has a bore 15 which receives a primary valve shutoff spool 16 constituting an important element of the invention. The casing 11 has fluid inlet and return fittings 17 and 18 of a conventional nature communicating with certain internal valve passages to be described in sufficient detail hereinafter.

A control link 19 operable manually from the pilot's compartment is pivotally connected at 20 with an input lever 21 mounted on a common rocker shaft 22 with a shorter interior input lever or crank 23 housed within a casing extension 24. The input lever 23 is pivoted at 25 to a primary valve spool drive link 26 similarly connected at 27 to a threaded coupling element 28 secured within the adjacent end of the primary spool 14.

The remote end of the valve casing 11 is closed by a cap 29 having an integral sleeve portion 30 which engages inside of the adjacent enlarged bore portion 31 of the casing 11. A pair of operating arms 32 and 33 for the secondary valve sleeve 13 and primary valve shutoff spool 16 are pivotally connected as at 34 with the cap 29 and have a slotted connection as shown at 35 with an axially movable pint or plunger 36 slidably engaged in a central opening of the cap 29 and having a reduced diameter portion 37 within the cap.

Extension elements 38 coupled with the adjacent end portion 39 of secondary valve sleeve 13 have slots 40 receiving the arms 32 and 33 so that movement of these arms on their pivots 34 can produce movement of the plunger 36 and ultimately movement of the primary valve shutoff spool 16 at the proper time. The arms 32 are moved in response to axial movement of the secondary valve sleeve 13 through the extensions 38, as will be fully discussed. Preloading double spring means 41 for the secondary sleeve 13 is provided as shown with one spring bearing against the element 38 and a seating ring 42 which abuts the end of stationary sleeve 12 and with the other spring bearing against seating ring 42 and cap 29. The pair of compression springs which comprise spring means 41 supply equal and opposite preload forces on the secondary sleeve to result in a balanced system when the secondary sleeve is at rest. Movement of the secondary sleeve in either the retract or extend direction will be resisted by the preload force of the appropriate spring of spring means 41.

The body 10 has an integral extension 43 parallel to the valve casing 11 and provided with a bore 44 for the piston head 45 of a power actuator ram 46 having one end coupled through an element 47 with a fixed structural part 48 of the aircraft. An opposite end extension 49 also integral with the body 10 is connected at 50 with a link 51 leading directly or indirectly to a particular aircraft control surface or element, or to a helicopter rotor control element, as the case may be.

Referring to FIG. 1, the valve is shown at the neutral condition and a pair of lands 52 and 53 on the primary spool 14 are interrupting flow through radial passages 54 and 55 in the secondary sleeve 13 leading to similar passages 56 and 57 of stationary sleeve 12, in turn communicating with annular grooves 58 and 59 formed in and between the stationary sleeve 12 and casing 11. At this time, pressurized fluid entering through the fitting 17 flows through registering narrow slots 60 and 61 of the sleeves 12 and 13, respectively, but is blocked on the annular space 62 between the lands 52 and 53. Similar flow from the fitting 17 through divergent passages 63 is blocked off in the grooves 64 of sleeve 13. Consequently, there is no porting of fluid from the inlet 17 to passages 54 and 56 and groove 58, or to passages 55 and 57 and groove 59, and therefore there is no fluid flow from the groove 59 to the passage means 65 leading into chamber 66 on one side of piston head 45, and no flow of fluid from groove 58 to passage means 67 leading into chamber 68 on the other side of actuator piston head 45.

It is also clearly evident in FIG. 1 that there will be no return flow of fluid from either passage means 65 or 67 into the bore 15 of primary spool 14 and through the radial return ports 69, 70 and 71 communicating with the return fitting 18. Pressure is balanced on opposite sides of the piston head 45 and the associated aircraft control surface or element will be locked.

Upon the application of a control input motion through the link 19 in a direction to cause extension of the actuator link 51, the rotary levers 21 and 23 through the drive link 26 will shift the primary spool 14 to a position slightly off of neutral as depicted in FIG. 2. In such normal operation by the pilot, the lands 52 and 53 now partially uncover the ports 54 and 55 and pressure fluid is ported through the aligned slots 60, 61 and space 62 into ports 55, 57 an groove 59, FIG. 2 leading to passage means 65 and chamber 66, thus raising the pressure in this chamber.

Simultaneously, pressure in the chamber 68 on the return side of pistonhead 45, FIG. 2, would be reduced and from this chamber fluid will flow in the return path through passage means 67, groove 58 and passages 56 and 54 to ports 72 of the primary spool 14 and from these ports to the bore 15 of the primary spool and then axially through this bore to return ports 69, 70 and 71 leading to return fitting 18. As a result of this, the link 51 will be moved relative to the piston head 45 to the right in FIG. 2, which is in the direction of extending the actuator for the particular aircraft control element. Fluid passing from the return fitting 18 is delivered back to the fluid reservoir, not shown in the drawing.

Assuming now that the primary valve spool 14 seizes or jams exactly at or very close to valve neutral, FIG. 1, the following will occur. The primary valve spool will, in effect, be immovable in relation to the second valve sleeve 13 due to the jamming. The pilot will automatically apply a higher input force on the cockpit linkage and this force will be transmitted through the elements 19, 21, 23 and 26 and through the jammed spool 14 to the secondary valve sleeve 13 for moving the latter. The higher input force is necessary to overcome the preload of the appropriate spring of spring means 41.

Since the primary spool valve 14 is jammed at the valve neutral, it is not porting any fluid and has no influence of the further performance of the actuator ram 46. The pilot has complete control of the actuator through movement of the secondary sleeve 13. It may easily be seen in FIG. 1 that a small shifting of the secondary sleeve 13 will disconnect the slots 60 and 61 and, depending upon the direction of movement to extend or retract the link 51, will place one of the grooves 64 in communication with the outer grooves or chambers 58 or 59. Assuming that pressure fluid is ported in this manner from the fitting 17 and one port 63 into groove 64 and from this groove through the port 64', FIG. 1, to the groove 58, this fluid will enter the passage 67 and pressurize the chamber 66 while pressure will be reduced in the chamber 66 and the control link 51 will be retracted relative to the fixed member 48. Return fluid from the chamber 66 will flow through the passage 65 into the outer groove 59 and from this outer groove through the port 57' to another groove 73 of secondary sleeve 13, and finally from this groove through the radial ports 71 and into the return fitting 18 connected with the reservoir. Consequently, the pilot will immediately have full control of the aircraft by operation of the secondary valve sleeve 13 when the primary spool 14 is jammed at the neutral position.

Considering the different situation illustrated in FIGS. 3 and 4 where jamming of the primary spool 14 occurs somewhere beyond neutral, for example 0.015 inches beyond neutral on a total spool stroke of ±0.020 inches, the following condition will prevail. FIG. 2 of the drawings may still be referred to in considering the spool 14 jammed off of neutral. The spool is porting pressure fluid at this time from the inlet fitting 17 and slots 60 and 61 through chamber 62 and ports 55 and 57 and groove 59 and from this groove into passage 65 into increase pressure in chamber 66, as previously described for normal operation when there was no jamming of the primary spool 14. However, with the primary spool jammed and immovable, the result will be an uncontrollable hard-over motion of the actuator link 51 and the associated aircraft control surface. This run away actuator will also drag the associated cockpit control elements along into the same hard-over position. The pilot, by natural reaction, will attempt to fight and reverse this run away situation by applying a reversing force to his cockpit control element. This reversing force will as before be transmitted through the link 19 and elements 21, 23, 26, etc. and through the stuck spool 14 to the secondary sleeve 13. The corrective effort by the pilot will overcome the effect of preload spring means 41 through reverse force applied through extensions 38 which are carried by secondary sleeve 13 and consequently the secondary sleeve, as shown in FIG. 3, will be moved in the proper reverse direction. As a result of this movement, the runaway condition of the actuator link 51 caused by jamming of the primary spool 14 will be stopped.

Continuing to refer to FIG. 3, is can be observed that the narrow slots 60 and 61 are beginning to move out of alignment and the grooves 64 are shifted so that one of them will port pressure to the outer groove 58 communicating with chamber 68. At the same time, returning fluid from the chamber 66 is being delivered into the groove 59 and from this groove to the groove 73 and ports 70 and 69 and then into the bore or space 15, and finally to the return fitting 18. This is exactly the opposite pressure and return flow from that established by the seized primary valve spool 14 as can be readily observed from the drawings. This means that at the position of the secondary valve sleeve 13 in FIG. 3, the action of the seized primary spool 14 has been balanced, and the actuator link 51 ceases its movement in the extended direction and becomes stationary at this point. Fluid pressure is balanced in the two chambers 66 and 68, although the pressure is not that of a normally operating four-way servo valve as where no binding of the primary spool has occurred.

It may be assumed, in connection with the above description for the off-neutral jamming of the primary spool, that hydraulic system pressure is 3,000 p.s.i. and therefore neutral cylinder pressure when operating with a jammed primary spool is approximately 1,500 p.s.i. When observing FIG. 3 of the drawings, it becomes apparent that the pressure balance which was achieved by the reverse motion of the secondary sleeve 13 is considerably lower than normal and the valve assembly is bypassing a considerable volume of fluid in this condition. Depending therefore on the extent or degree of off-neutral where seizure of the spool 14 takes place, the pilot will or will not be able to reverse the motion of the link 51 and reestablish proper flight control. If the spool 14 jams considerably off neutral or near the end of its stroke, the associated bypass flow volume on using the secondary sleeve 13 and the resultant lowering of neutral cylinder pressure will render it impossible for the pilot to regain flight control and he will only be able to arrest or stop the runaway condition of actuator link 51. Restated, the more toward valve spool extremes the seizure occurs, the less the pilot will be able to regain flight control, while he will always be able to stop the runaway motion of the actuator. The reason for this is simply that the pilot on trying to reverse the actuator motion must be able despite the large bypassing of fluid to create sufficient pressure differential between the chambers 66 and 68 to cause the actuator to respond to the pilot's command while working against the existing aerodynamic loads.

It is therefore evident that the valve assembly as thus far described is not totally adequate since there is never a guarantee that the spool 14 will jam at or near its neutral point. Accordingly, an important feature has been incorporated into the valve structure which will assure the regaining of full flight control in all cases, regardless of the point of jamming of the primary valve spool 14. The feature in question resides in the primary valve shutoff spool 16 and the operating means associated therewith, the structure of which components has already been described, although not the operation.

The shutoff spool 16 is normally in the position relative to the primary spool 14 indicated in FIG. 3, where the port 69 is uncovered. The relationship of parts in FIG. 3 already described in detail sets up a considerable bypassing of fluid which may render impossible the regaining of flight control by reversing the movement of the actuator link 51. However, the pilot is able to simply pass smoothly over the condition illustrated in FIG. 3 by further moving the secondary valve sleeve 13 reversely or in the actuator retract direction. In so doing, the pilot through the movement of the extensions 38 and pivoted arms 32 and 33 and the axial plunger 36 will engage and shift the shutoff spool 16 to the position illustrated in FIG. 4 where this spool covers the radial ports 69 in the main return flow system leading to the fitting 18. This of course will instantly stop the bypassing of fluid, previously described, and the resultant loss of operating pressure necessary to reverse the movement of the ram 46 and actuator link 51. The actual movement of the shutoff spool 16 to its position in FIG. 4 is accomplished through the plunger extension 37 contacting the end of the spool. Near such end, the spool 16 is equipped with a conventional locking pawl mechanism 74 which expands when the shutoff spool 16 moves adjacent to a cavity 75 in the surrounding portion of the primary spool 14. The pawl mechanism 74 will securely lock the shutoff spool with relation to the primary valve spool 14 in the return port closing position of FIG. 4.

It is now apparent in connection with FIG. 4 that the primary valve shutoff spool 16 has closed the return fluid passages of the primary spool 14, namely, the ports 69 and associated ports and grooves leading to the fitting 18 and the objectionable conditions discussed in connection with FIG. 3 are fully eliminated. From the moment that the parts assume their relationship of FIG. 4, the pilot is able to use the secondary sleeve 13 to fully control and move the actuator link 51 just as well as if the primary valve spool were jammed at the neutral position. In fact, the degree of control restored to the pilot is the same as would be available where the primary spool was not jammed at all.

FIG. 4 also illustrates that movement of the secondary sleeve 13 further than 0.020 inches beyond neutral causes the narrow inlet slots 60 and 61 to shift totally out of alignment and therefore the primary spool 14 is disconnected from the system pressure source. This condition eliminates one source of bypassing during the interval when the pilot is moving the secondary valve sleeve 13 in the reverse direction and this will make the entire unit more responsive to the pilot's command before the shutoff spool 16 has closed the main return porting. Hence, the narrow slots 60 and 61 form a significant feature. The more important feature, however, is that regardless of where within the total available stroke the primary valve spool 14 seizes, the total correction stroke of the secondary valve sleeve 13 required to stop a runaway actuator will never be more than the width of the lateral pressure inlet slots 60, 61 leading to the primary valve spool.

It has now been disclosed that the invention servo valve unit by virtue of its fluid porting configuration including the narrow slots 60, 61 and through the provision of the unique shutoff spool 16 to eliminate fluid bypassing enables the pilot of the aircraft on the occurrence of a primary valve spool seizure at any point in the total stroke of the spool to regain almost instantly full and complete control of the affected power actuator in addition to arresting the runaway movement thereof.

It is believed that the significant advantages of the invention over the known prior art will now be fully appreciated without further description.

In the drawings, for reasons of simplicity and clarity, the total operating mechanism for the shutoff spool 16 has not been illustrated. A seizure of the primary spool 14 in the retract direction requires a corrective stroke of the secondary valve sleeve 13 in the actuator extend direction. The secondary valve sleeve will therefore require a shutoff spool operating lever and push rod system externally of the valve body that will actuate such additional mechanism at the other end of the valve body. This additional mechanism need not be included in the present application for a proper understanding of the invention and, in fact, forms no part of the present invention, the latter being complete and possessing full utility in its present form. It should be further mentioned that design details of the valve housing and its input mechanism are purely incidental and may be varied in practice.

It is to be understood that the form of the invention herewith shown and described is to be taken as a preferred example of the same, and that various changes in the shape, size and arrangement of parts may be resorted to, without departing from the spirit of the invention or scope of the subjoined claims.

What I claim is:

1. A servo valve assembly for aircraft hydraulic flight controls comprising a valve casing having fluid inlet and return passage means and pressure and return ports communicating with said passage means, a secondary valve sleeve mounted for axial movement in said casing and also having pressure and return ports adapted to communicate with the ports of the casing, a primary valve spool mounted for longitudinal reciprocation in said secondary valve sleeve and having ports movable into covering and uncovering relationship with the pressure and return ports of the secondary sleeve and also having return passage means, a primary valve shutoff spool within said primary valve spool and operable to close the return passage means of the primary valve spool, a manual linkage operable by the pilot of the aircraft to shift the primary valve spool longitudinally in said secondary sleeve, linkage means connected with the secondary valve sleeve including a movable part engageable with said shutoff spool to shift the shutoff spool axially in the direction for covering the return passage means of the primary valve spool, resilient preloading means connected with the secondary sleeve and resisting movement of the secondary sleeve but yielding to allow such movement when the primary valve spool jams in the secondary sleeve and a sufficient force is applied to the secondary sleeve through the jammed primary spool and said manual linkage, a cylinder associated with the valve casing, a flight control actuator ram within said cylinder for reciprocation including a piston element dividing said cylinder into a pair of chambers, fluid passage means interconnecting said chambers with said casing inlet and return passage means, said actuator ram being connected to a fixed structural element of the aircraft, and an actuator link on said cylinder and movable therewith and adapted for connection with an aircraft flight control element having aerodynamic loading.

2. The structure of claim 1, and automatically operable means to lock said primary valve shutoff spool in the position to close said return passage means of the primary valve spool after the shutoff spool have been shifted by the linkage means connected with the secondary valve sleeve.

3. The structure of claim 2, and a stationary valve sleeve within the valve casing in surrounding relationship to said secondary valve sleeve, said stationary sleeve having said pressure and return ports communicating with said inlet and return passage means.

4. A jamproof servo valve assembly for aircraft hydraulic flight controls comprising a valve casing having fluid inlet and return connections, a secondary valve sleeve mounted for reciprocation within said casing, resilient means resisting movement of the secondary valve sleeve, a primary valve spool having a bore and disposed within said secondary valve sleeve for reciprocation and being subject to jamming in said secondary sleeve, linkage means having a connection with said primary valve spool to shift the same axially within the secondary valve sleeve, a primary valve shutoff spool in the bore of said primary valve spool and being movable relative to the primary valve spool to close certain return flow passages in the primary valve spool, and means having a connection with the secondary valve sleeve and responding to movement of such sleeve when said primary spool is jammed therein to move said shutoff spool to a position closing said return flow passages of the primary valve spool.

5. The structure of claim 4, and means connected with said shutoff spool to lock the same relative to said primary valve spool following movement of the shutoff spool by said means having a connection with the secondary valve sleeve.

6. The structure of claim 4, and a flight control actuator including a cylinder and ram associated with said valve assembly, and fluid passage means interconnecting end portions of the actuator cylinder with passage means of the valve casing, whereby fluid may be selectively ported into one end of the cylinder and returned from the other end thereof.

7. The structure of claim 4, and said valve casing having fluid pressure and return port means adapted to communicate with said fluid inlet and return connections, said secondary valve sleeve having porting means thereon shiftable into active and inactive relationship with the fluid pressure and return port means of the casing and also having additional pressure and return port means adapted to register with the corresponding port means of the valve casing, spaced lands on the primary valve spool movable into covering and uncovering relation with the pressure and return port means of the secondary valve sleeve, said primary spool having its own fluid return passage means adapted to communicate with the pressure and return port means of the secondary valve sleeve, and said casing and secondary valve sleeve each having narrow ports which register prior to movement of the secondary sleeve in the casing in response to a movement of the primary valve spool jammed in the secondary sleeve, the narrow port of the casing being in direct communication with said inlet connection of the casing.

8. A jamproof servo valve assembly for controlling a power actuator in a hydraulic aircraft flight control system, said servo valve assembly comprising a casing having fluid inlet and return connections and fluid passages leading to and from chambers of an actuator cylinder, a secondary valve sleeve within the casing and being normally held stationary relative to the casing but adapted to move axially under a predetermined force applied thereto, a primary valve spool mounted for axial movement within the secondary valve sleeve and being operable to port fluid to and from said actuator cylinder chambers under normal servo valve operating conditions, said primary spool capable of jamming within the secondary valve sleeve in a valve neutral position therein or in any position off of neutral along the total stroke of the primary valve sleeve, movement of the jammed primary valve spool forcing the secondary valve sleeve to move and to take over the control function of the primary spool in porting fluid to and from said chambers, said primary valve spool having return fluid passage means leading to said return connection, and an element movable with respect to the primary valve spool to close the return fluid passage means of the primary valve spool responsive to movement of the secondary valve sleeve in one direction with the primary spool jammed therein, whereby the primary valve spool is then functionally isolated from the system.

9. The structure of claim 8, and said element movable with respect to the primary valve spool comprises another spool within a bore of the primary valve spool, and a mechanical linkage to move the last-named spool and having a connection with the secondary valve sleeve and allowing the secondary valve sleeve and primary valve spool to move for a certain distance within the casing without effecting movement of the spool within the bore of the primary spool, a part of said linkage engaging and causing movement of the last-named spool relative to the primary spool after further movement of the primary spool with the secondary sleeve to cause closing of the return fluid passage means of the primary spool.

10. The structure of claim 9, and yielding means to automatically lock said spool in the bore of the primary valve spool in its moved position responsive to the operation of said linkage.